US007224267B1

(12) United States Patent
Ellis

(10) Patent No.: US 7,224,267 B1
(45) Date of Patent: May 29, 2007

(54) TIRE PRESSURE MONITORING SYSTEM

(75) Inventor: Nathaniel Ellis, Dublin, OH (US)

(73) Assignee: Honda Motor Co. Ltd., Tokyo (JP)

(*) Notice: Subject to any disclaimer, the term of this patent is extended or adjusted under 35 U.S.C. 154(b) by 152 days.

(21) Appl. No.: 10/856,677

(22) Filed: May 28, 2004

(51) Int. Cl.
*B60C 23/00* (2006.01)

(52) U.S. Cl. .............. 340/442; 445/449; 73/35.02; 73/146.5; 123/1 A

(58) Field of Classification Search .......... 340/442, 340/438, 447, 449, 445; 73/146.5, 35.02; 123/1 A
See application file for complete search history.

(56) References Cited

U.S. PATENT DOCUMENTS

| 4,512,278 A * | 4/1985 | Winther .................. 116/34 R |
| 5,963,128 A | 10/1999 | McClelland |
| 5,984,429 A * | 11/1999 | Nell et al. .............. 303/113.4 |
| 6,016,102 A | 1/2000 | Fortune et al. |
| 6,434,470 B1 * | 8/2002 | Nantz et al. ................ 701/93 |
| 6,580,364 B1 | 6/2003 | Munch et al. |

OTHER PUBLICATIONS

U.S. Appl. No. 10/190,805, filed Jul. 8, 2002, Breed et al.

* cited by examiner

*Primary Examiner*—Davetta W. Goins
(74) *Attorney, Agent, or Firm*—Ditthavong Mori & Steiner, P.C.

(57) ABSTRACT

A system and method for monitoring tire pressure in a tire of a vehicle is described, in which a tire pressure reading in the tire and an ambient pressure reading are received, and a warning indicator visible to an operator of a vehicle is selectively activated based on the tire pressure reading, the ambient pressure reading, and a predetermined threshold. In one embodiment, the ambient pressure is used by an engine control system for regulating the air-fuel intake, transmitted to a communications bus, and used by a tire pressure monitoring subsystem configured for receiving the ambient pressure reading from the communications bus.

20 Claims, 4 Drawing Sheets

TIRE PRESSURE MONITORING SYSTEM

FIELD OF THE INVENTION

The present invention relates to automotive and truck systems and more particularly to a tire pressure monitoring system.

BACKGROUND OF THE INVENTION

Maintenance of the proper pressure within tires is important because under-inflated tires can lead to reduced fuel economy, increased tread wear, and reduced vehicle safety. Despite the benefits of maintaining proper tire pressure, surveys have found that most drivers do not regularly check their tires at least once a month. As a result, vehicles are being outfitted with tire pressures sensors placed within the tires to detect whether the pressure inside each of the tires falls below a certain level, such as 80% of the placard pressure listed for the tire. When the tire pressure is detected to fall below the level, an indicator on the dashboard is lit to inform the driver that one or more of the tires are under-inflated.

It is desirable for a tire pressure monitoring system to be accurate, not only in avoiding failures in detecting under-inflated tires ("false negatives"), but also in avoiding incorrect warnings that the tires are under-inflated ("false positives"). False positive readings can be pernicious because the erroneous readings often disappear when the driver measures the tire pressure with a pen gauge, leading some drivers to ignore the low-tire pressure warnings altogether or bring the vehicle to a dealer at a cost of time, money, and the loss of the use of the vehicle.

Thus, there is a need for accurate measurement of tire pressure in a tire pressure monitoring system. Moreover, there is a need for improving the accuracy of existing tire pressure monitoring systems without significantly increasing their cost.

SUMMARY OF THE INVENTION

The present invention stems from the realization that one source of inaccuracy in tire pressure readings comes from the differences in atmospheric pressure at different altitudes. More specifically, the placard pressure for a tire is referenced to sea-level pressure, while a tire pressure gauge applied to a valve stem of a tire measures the pressure inside the tire relative to the current ambient, atmospheric pressure. The ambient pressure is affected by altitude. For example, at sea-level the ambient pressure is 14.7 psia, while in Denver at 5000 feet the ambient pressure drops to about 12.2 psia. Thus, a person at 5000 feet who adds or removes air from a tire to a placard pressure of 30 psig according to the person's gauge will result in a tire with an absolute pressure as measured by a tire sensor placed within the tire that is about 2.5 psia less than what a person at sea level would achieve. For high-altitude drivers, the 20% margin is cut in half. Furthermore, daily fluctuations in temperature are more severe at high altitudes, ranging up to a difference of 50 degrees Fahrenheit, can cause swings in the internal tire pressure. As a result, high-altitude drivers are more vulnerable to conventional tire pressure monitoring systems that may falsely indicate a low pressure warning when the tire is properly inflated according to the gauge pressure reading.

Accordingly, one aspect of the present invention addresses this need for improved accuracy by a method for monitoring tire pressure in a tire of a vehicle, in which a tire pressure reading in the tire and an ambient pressure reading are received. The difference of the tire pressure reading and the ambient pressure reading (i.e., the gauge pressure) is compared with a predetermined threshold, and if the difference is less than the threshold, then a warning indicator visible to an operator of the vehicle is activated. In another implementation of this embodiment, the tire pressure reading is compared with the sum of the ambient pressure reading and a predetermined threshold. Thus, in this aspect, like is compared with like—either gauge pressure with gauge pressure, or absolute pressure relative to sea level with absolute pressure relative to sea level—thereby resulting in increased accuracy and a lower rate of false positives.

Another aspect of the present invention addresses the need for a cost-sensitive implementation of improved accuracy tire pressure monitoring systems. For example, provision of an ambient pressure sensor for the sole use of the tire pressure monitoring system may add unnecessary cost to the vehicle. Accordingly, this aspect of the present invention is directed to an automotive system that comprises a communications bus, a tire pressure sensor disposed within a tire for measuring a tire pressure, an ambient pressure sensor for measuring an ambient pressure, and an engine control system for regulating the air-fuel intake based on the ambient pressure, and a tire pressure monitoring system. The engine control system is also configured for transmitting an indication of the ambient pressure to the communications bus, and tire pressure monitoring system is configured for receiving the ambient pressure from the communications bus and selectively activating a warning indicator visible to an operator of a vehicle based on the tire pressure, the ambient pressure, and a predetermined threshold. In some embodiments of the present invention, the tire pressure monitoring system and the engine control system may be software-controlled and upgrading a vehicle to include the new tire pressure monitoring technology can be accomplished by installing new software on an existing hardware infrastructure, such as the engine control system and the tire pressure monitoring system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for monitoring tire pressure are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
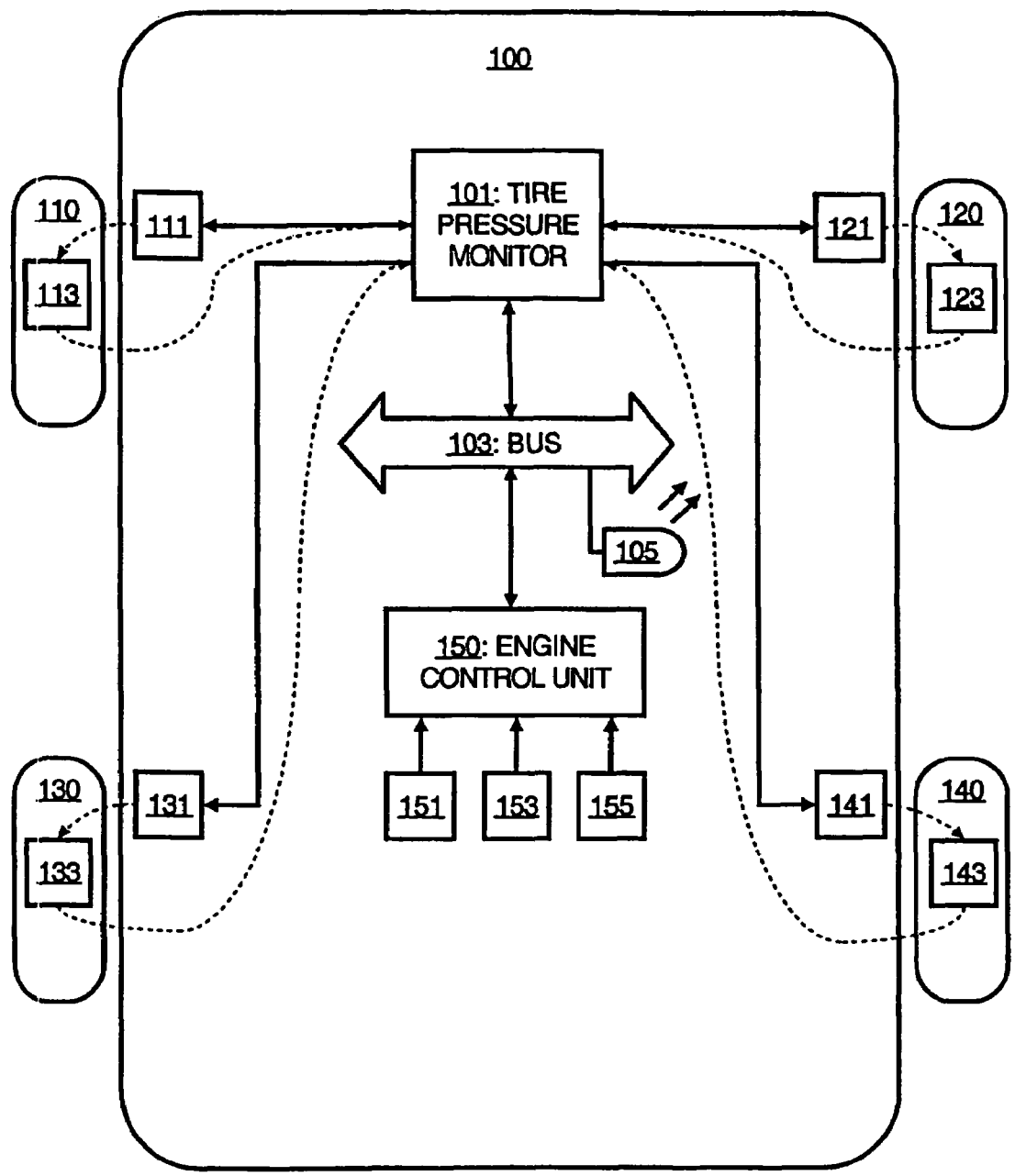
FIG. 1 is a high-level block diagram of an automotive system in accordance with an embodiment of the present invention.

Referring to FIG. 1, an automotive system 100 is depicted, in which a tire pressure monitoring subsystem 101 is deployed for monitoring the pressure within tires 110, 120, 130, and 140. Although four tires 110, 120, 130, and 140 are illustrated in FIG. 1, the present invention is not limited to automotive, truck, or other vehicle system with exactly four tires but may be advantageously employed with vehicles having any number of tires.

The tire pressure monitoring subsystem 101 is in communication with a number of wheel initiators 111, 121, 131, and 141, each disposed in the vicinity of a corresponding tire 110, 120, 130, and 140, for example, by being mounted underneath the splash guard in the wheel well. Each wheel initiator is preferably in wireless, such as low frequency (LF), communication with a corresponding tire pressure sensor 113, 123, 133, and 143 disposed within in the tire, e.g. on a wheel rim. Each tire pressure sensor 113, 123, 133, and 143 is responsive to signals transmitted from the corresponding wheel initiator 111, 121, 131, and 141 for measuring the pressure within the tire at specified intervals and transmitting the pressure readings to the tire pressure monitoring subsystem 101, preferably by a wireless communication carrier such as radio frequency (RF).

The tire pressure monitoring subsystem 101 is configured for receiving the tire pressure readings from the tire pressure sensors 113, 123, 133, and 143 and determining whether the tire pressure is too low based on the tire pressure readings, a predetermined threshold, and other inputs as explained in greater detail below. In one embodiment, the tire pressure monitoring subsystem 101 is configured for selectively activating, via a data communications bus 103, an indicator 105 visible to an operator of the vehicle warning of low pressure in one or more of the tires 110, 120, 130, and 140. The data communications bus 103 can be implemented with a high-integrity, serial, data communications bus for real-time control applications, such as the Controller Area Network (CAN) bus defined by ISO11898 or with other communication paths suitable transmitting information between microcontrollers on a vehicle. The warning indicator 105 can be a lamp or other display element mounted on a dashboard or heads up display of the vehicle.

Also in communication with the data communications bus 103 is an engine control unit 150, which is configured for regulating the mixture of fuel and air (or other oxidant) based on various sensor readings, such as those from an ambient pressure sensor 151 for measuring the atmospheric pressure surrounding the vehicle, an air-intake manifold air pressure sensor 153 for measuring the pressure with in the air-intake manifold, and a thermometer 155 for measuring the manifold air temperature. Other monitoring devices such as a vehicle speed pulse input (not shown) can be deployed, either at an electronic control unit, such as the tire pressure monitoring subsystem 101 and engine control unit 150, or directly on to the data communications bus 103.

Figure 2:
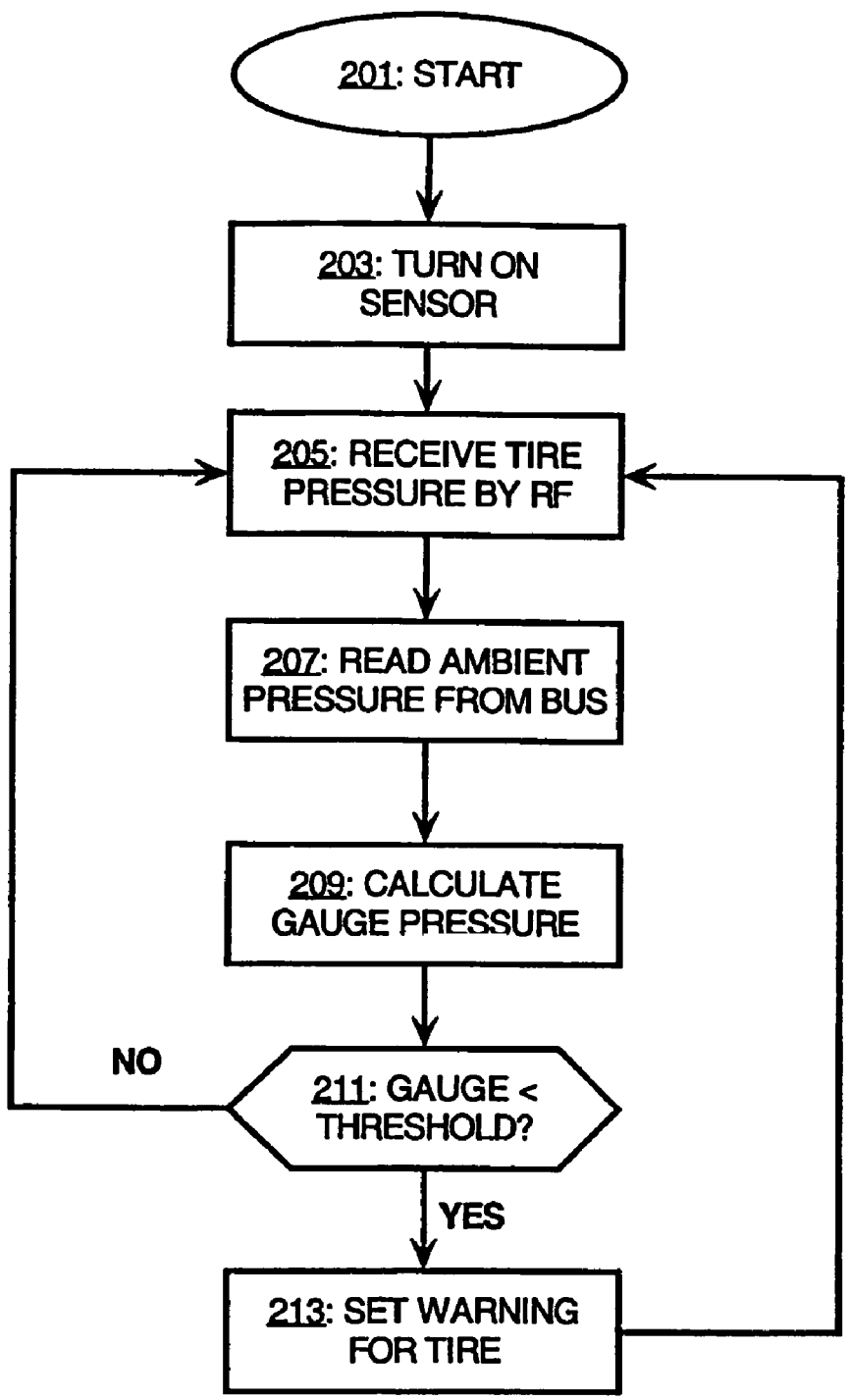
FIG. 2 is a flowchart illustrating an operation of monitoring tire pressure in an embodiment of the present invention.

FIG. 2 shows a flowchart 200 illustrating an operation of the tire pressure monitoring subsystem 101 for an embodiment of the present invention. Without loss of generality, the operation of the tire pressure monitoring subsystem is illustrated with respect to the front, left tire 110, although a person of skill in the art can readily apply the teachings of this description to the other tires 120, 130, and 140. At step 201, the vehicle is started, e.g. by ignition, and in response the tire pressure monitoring subsystem 101 directs the wheel initiator 111 to activate the tire pressure sensor 113 (step 203). In one implementation, the wheel initiator 111 communicates with the tire pressure sensor 113 over a wireless communications path, such as via low frequency (LF). When activated, the tire pressure sensor 113 begins, or increases the frequency of, periodically reading the tire pressure within the tire and transmits the tire pressure reading to the tire pressure monitoring subsystem 101 preferably via a wireless communications path such as radio frequency (RF).

At step 205, the tire pressure monitoring subsystem 101 receives the tire pressure reading transmitted from the tire pressure sensor 113 for determining whether the pressure within the tire 110 is so low that a warning indicator should be activated. The tire pressure reading is a reading of the internal pressure within the tire referenced to the atmospheric pressure at sea level (14.7 psia, or 101.3 kPa). At step 207, the tire pressure monitoring subsystem 101 reads the ambient pressure from the data communications bus 103, and then calculates a gauge pressure reading (step 209) by subtracting the ambient pressure from the tire pressure reading. For example, the internal pressure reading is 44.7 psia and the ambient pressure at sea level is 14.7 psia, then the gauge pressure reading would be 44.7 psia–14.7 psia=30.0 psig. In Denver at 5000 feet of elevation, however, the ambient pressure is about 12.2 psia, so the gauge pressure reading at that altitude would be 44.7 psia–12.2 psia=32.5 psig. The ambient pressure may be read continuously, e.g. updated every 100 ms, or may be based on the ambient pressure at which ignition occurred, e.g. an ambient pressure measured within a predetermined number of vehicle speed pluses (generated, e.g. at each rotation of the wheel) since ignition and used in calculating the gauge pressure even after twice as many vehicle speed pluses have been detected. In the former embodiment, the calculated gauge pressure is responsive to changes in altitude as the vehicle is being driven, and in the latter embodiment, the calculated gauge pressure is representative of the altitude when the vehicle was turned on, on the supposition that the operators tend to inflate their tires when the tires are cold and the engine is not running which may correspond to the altitude when the tire pressure was last checked by the operator.

At step 211, the gauge pressure reading is compared with a predetermined threshold tire pressure value for the vehicle, which may be set at 80% of the placard pressure for tires recommended for the vehicle. The placard pressure for many automobiles is set to about 30 psig, and higher for trucks, e.g. 35 psig. Accordingly, the predetermined threshold tire pressure value would be set to 24 psig and 28 psig, respectively. In an alternative implementation, the ambient pressure is added to the predetermined threshold and then compared with the absolute tire pressure reading received from the sensor.

If the calculated gauge reading is higher than the predetermined threshold tire pressure, then execution loops back to step 205 where another tire pressure reading is received and processed. If, on the other hand, the calculated gauge reading is less than the predetermined threshold tire pressure, then the warning indicator 105 is set for the tire 110 (step 213). After setting the warning indicator, the execution of the tire pressure monitoring system 101 returns to step 205 where another tire pressure reading is received and processed.

Provision of an ambient pressure sensor for the sole use of the tire pressure monitoring subsystem 101 may add cost to the vehicle, so it is advantageous to leverage the function of a pre-existing ambient pressure sensor, if practical. Accordingly, in one embodiment of the present invention, the ambient pressure sensor 151 by the engine control unit 150 is used as the source of ambient pressure readings for use by the tire pressure monitoring subsystem 101. Thus, even though a second ambient pressure sensor is omitted, the function of the second ambient sensor, namely to provide a source of ambient pressure readings for the tire pressure monitoring subsystem 101, is retained.

Figure 3:
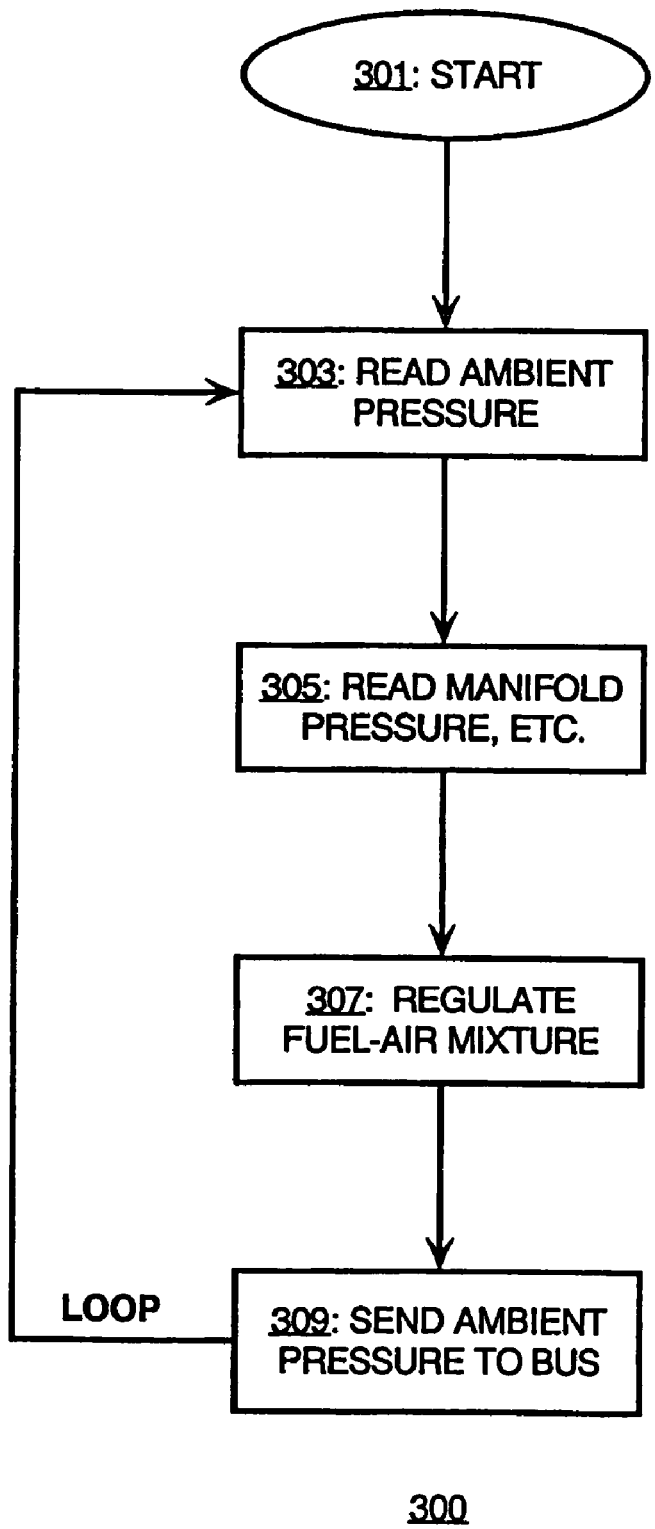
FIG. 3 is a flowcharting illustrating an operation of reading an ambient pressure in accordance with an embodiment of the present invention.

FIG. 3 includes a flowchart 300 illustrating the operation of one such implementation in which the ambient pressure is mediated through the engine control unit 150 and the data communications bus 103. At step 301, the vehicle is started, and the engine control unit 150 reads the ambient pressure from ambient pressure sensor 151 (step 303). At step 305, the engine control unit 150 obtains other readings by reading a pressure sensor 153 and a thermometer 155 disposed in an air-intake manifold. These and other data (such as vehicle speed pulses) may be read, either directly by the engine control unit 150 or fetched from the data communications bus 103. At step 307, the engine control unit 150 regulates the mixture of fuel and air or other oxidant, which is supplied to the engine of the vehicle, for example by fuel injection.

At step 309, the engine control unit 150 also transmits the ambient pressure reading in a packet on the data communications bus 103. Various bus protocols may be used. For example, in one protocol, the packet is broadcast to devices on the data communications bus 103 with the packet being tagged by a value indicating that packet contains an ambient pressure sensor. In another, the packet can be tagged with a source and/or recipient address or identifier, in which the engine control unit 150 would specifically transmit the ambient pressure reading to the tire pressure monitoring subsystem 101.

Figure 4:
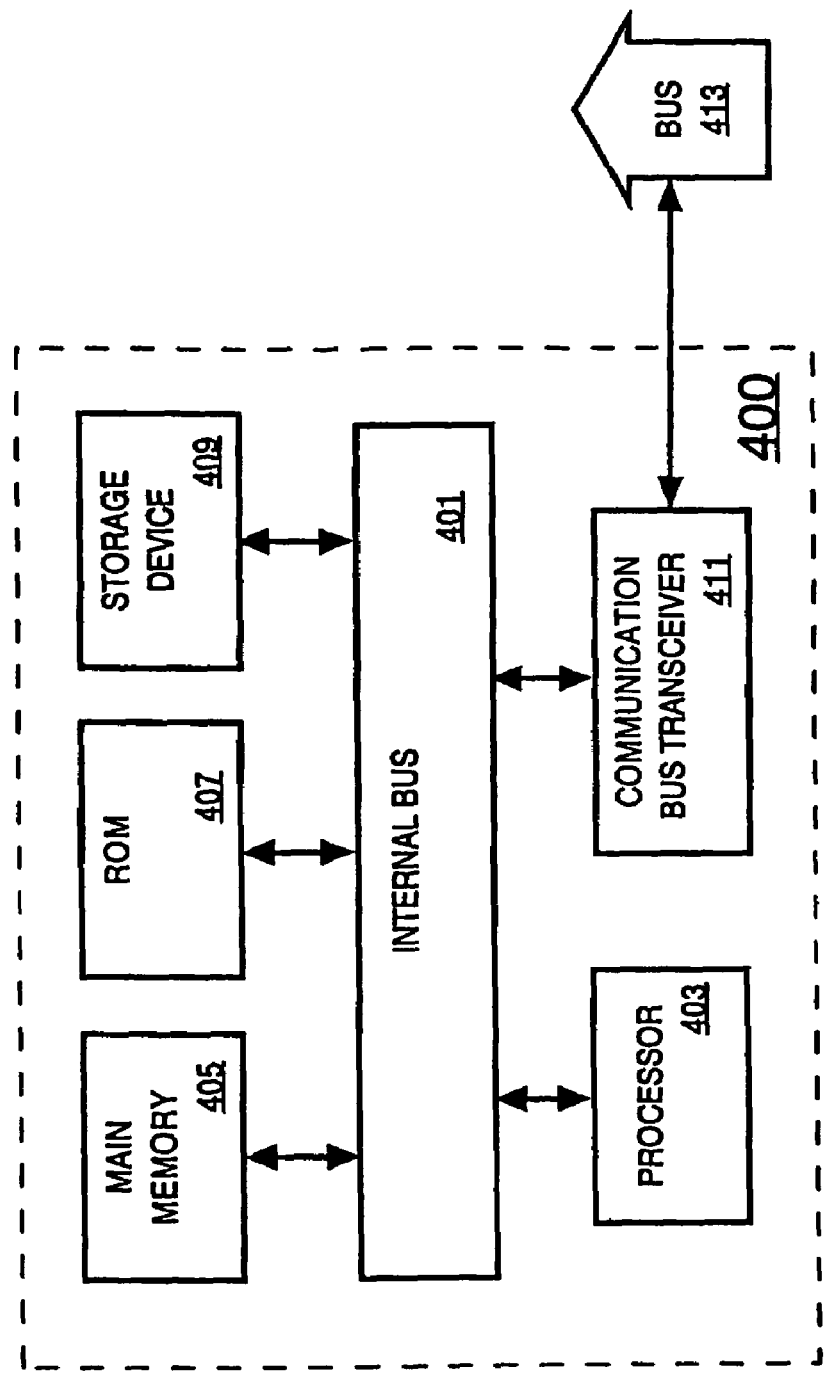
FIG. 4 depicts an electronic control unit that can be used to implement an embodiment of the present invention.

Both the tire pressure monitoring subsystem 101 and the engine control unit 150 can be implemented by a controller such as an exemplary electronic control unit 400 illustrated in FIG. 4 or a controller illustrated in U.S. Pat. No. 6,580, 364 issued Jun. 17, 2003 to Munch et al., the contents of which are hereby incorporated by reference herein in their entirety. The electronic control unit 400 includes an internal bus 401 or other communication mechanism for communicating information and a microcontroller 403 or other computer processor coupled to the internal bus 401 for processing information. The electronic control unit 400 also includes main memory 405, such as a random access memory (RAM) or other dynamic storage device, coupled to the internal bus 401 for storing information and instructions to be executed by the microcontroller 403. Main memory 405 can also be used for storing temporary variables or other intermediate information during execution of instructions by the microcontroller 403. The electronic control unit 400 may further include a read only memory (ROM) 407 or other static storage device coupled to the internal bus 401 for storing static information and instructions for the microcontroller 403. A storage device 409, such as FLASH memory, a magnetic disk or optical disk, may also be coupled to the internal bus 401 for persistently storing information and instructions. In some implementations, FLASH memory can be used to provide the memory for the main memory 405, ROM 407, and storage 409

According to an embodiment of the invention, tire pressure monitoring is provided by the electronic control unit 400 in response to the microcontroller 403 executing an arrangement of instructions contained in main memory 405. Such instructions can be read into main memory 405 from another computer-readable medium, such as the storage device 409. Execution of the arrangement of instructions contained in main memory 405 causes the microcontroller 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The exemplary electronic control unit 400 also includes a bus transceiver 411 or other kind of communication interface coupled to internal bus 401. The bus transceiver 411 provides a two-way data communication coupling to a local area data bus 413, such as data communications bus 103. Although a single bus transceiver 411 is depicted in FIG. 4, multiple communication interfaces can also be employed, especially for diagnostic connections, which may include a digital subscriber line (DSL) card or modem, an integrated services digital network (ISDN) card, a cable modem, a telephone modem, or any other communication interface to provide a data communication connection to a corresponding type of communication line. As another example, other kinds of communications interfaces may be a local area network (LAN) card (e.g. for Ethernet™ or an Asynchronous Transfer Model (ATM) network) to provide a data communication connection to a compatible LAN. Wireless links can also be implemented. In any such implementation, however, a communications interface, such as the bus transceiver 411, sends and receives electrical, electromagnetic, or optical signals that carry digital data streams representing various types of information. The signals through various networks and the signals on the local area data bus 413 and through the bus transceiver 411, which communicate digital data with the electronic control unit 400, are exemplary forms of carrier waves bearing the information and instructions.

The electronic control unit 400 can send messages and receive data, including program code, through the network(s), the network link, and the bus transceiver 411. A server (not shown) could transmit requested code belonging to an application program for implementing an embodiment of the present invention through various networks and a communications interface coupled to the internal bus 401 such as the bus transceiver 411. The microcontroller 403 may execute the transmitted code while being received and/or store the code in the storage device 409, or other non-volatile storage for later execution. In this manner, the electronic control unit 400 may obtain application code in the form of a carrier wave.

The term "computer-readable medium" as used herein refers to any medium that participates in providing instructions to the microcontroller 403 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the internal bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

By this architecture, an automotive system can be upgraded without necessarily adding additional hardware, by installing new instructions on the storage devices 409 of the electronic control units 400 implementing the tire pressure monitoring subsystem 101 and the engine control unit 150. More specifically, the upgraded instructions for the tire pressure monitoring subsystem 101 can include instructions for performing the steps illustrated in flowchart 200 of FIG. 2, and the engine control unit 150 can be upgraded with instructions for performing the steps illustrated in flowchart 300 of FIG. 3.

Accordingly, embodiments of a tire pressure monitoring system have been described in which the tire pressure can be more accurately monitored in high altitude use while not appreciably adding the costs associated with adding additional hardware components.

While the present invention has been described in connection with a number of embodiments and implementations, the present invention is not so limited but covers various obvious modifications and equivalent arrangements, which fall within the purview of the appended claims.

What is claimed is:

1. A method of monitoring tire pressure in a tire of a vehicle, comprising:
   receiving input indicative of a tire pressure reading in the tire;
   receiving input indicative of an ambient pressure;
   comparing a difference of the tire pressure reading and the ambient pressure reading with a predetermined threshold;
   if the difference is less than the predetermined threshold, then activating a warning indicator visible to an operator of the vehicle.

2. A method according to claim 1, wherein said receiving the input indicative of the ambient pressure includes receiving the input from an engine control subsystem configured for managing fuel intake.

3. A method according to claim 2, wherein said receiving the input indicative of the ambient pressure includes:
   receiving a packet broadcast to a serial data communications bus; and
   checking the packet to determine whether content of the packet is indicative of the ambient pressure.

4. A method according to claim 1, wherein said receiving indicative of the tire pressure reading in the tire includes receiving the input from a sensor disposed within the tire.

5. A method of monitoring tire pressure in a tire of a vehicle, comprising:
   receiving input indicative of a tire pressure reading in the tire;
   receiving input indicative of an ambient pressure;
   comparing the tire pressure reading with a sum of the ambient pressure reading and a predetermined threshold;
   if the tire pressure reading is less than the sum, then activating a warning indicator visible to an operator of the vehicle.

6. A method according to claim 5, wherein said receiving the input indicative of the ambient pressure includes receiving the input from an engine control subsystem configured for managing air fuel intake.

7. A method according to claim 6, wherein said receiving the input indicative of the ambient pressure includes:
   receiving a packet broadcast to a serial data communications bus; and
   checking the packet to determine whether content of the packet is indicative of the ambient pressure.

8. A method according to claim 5, wherein said receiving indicative of the tire pressure reading in the tire includes receiving the input from a sensor disposed within the tire.

9. An automotive system comprising:
   a communications bus;
   a tire pressure sensor disposed within a tire for measuring a tire pressure;
   an ambient pressure sensor for measuring an ambient pressure;
   an engine control system for regulating air fuel intake based on the ambient pressure and transmitting an indication of the ambient pressure to the communications bus; and
   a tire pressure monitoring system configured for:
      receiving input indicative of the tire pressure from the tire pressure sensor,
      receiving the indication of the ambient pressure from the communications bus; and
      selectively activating a warning indicator visible to an operator of a vehicle based on the tire pressure, the ambient pressure, and a predetermined threshold.

10. An automotive system according to claim 9, wherein the tire pressure system is configured for:
  comparing a difference of the tire pressure and the ambient pressure with the predetermined threshold;
  if the difference is less than the predetermined threshold, then activating the warning indicator.

11. An automotive system according to claim 9, wherein the tire pressure system is configured for:
  comparing the tire pressure with a sum of the ambient pressure and a predetermined threshold;
  if the tire pressure reading is less than the sum, then activating the warning indicator.

12. An automotive system according to claim 9, wherein the tire pressure system is configured for:
  receiving a packet broadcast to a serial data communications bus; and
  checking the packet to determine whether content of the packet is indicative of the ambient pressure.

13. A computer-readable medium bearing instructions for operating an tire pressure sensor system, said instructions being arranged, upon execution thereof, to cause one or more processors to perform the steps of:
  receiving input indicative of tire pressure from a tire pressure sensor,
  receiving an indication of the ambient pressure from a communications bus; and
  selectively activating a warning indicator visible to an operator of a vehicle based on the tire pressure, the ambient pressure, and a predetermined threshold.

14. A computer-readable medium according to claim 13, wherein said selectively activating includes:
  comparing a difference of the tire pressure and the ambient pressure with the predetermined threshold;
  if the difference is less than the predetermined threshold, then activating the warning indicator.

15. A computer-readable medium according to claim 13, wherein said selectively activating includes:
  comparing the tire pressure with a sum of the ambient pressure and a predetermined threshold;
  if the tire pressure reading is less than the sum, then activating the warning indicator.

16. A computer-readable medium according to claim 13, wherein said selectively activating includes:
  receiving a packet broadcast to a serial data communications bus; and
  checking the packet to determine whether content of the packet is indicative of the ambient pressure.

17. An automotive system according to claim 13, wherein the ambient pressure was measured within a predetermined number of vehicle speed pulses since ignition and used for monitoring tire pressure after at least twice the predetermined number of vehicle speed pulses.

18. A computer-readable medium bearing instructions for operating an engine control system, said instructions being arranged, upon execution thereof, to cause one or more processors to perform the steps of:
  reading an ambient pressure value from a pressure sensor;
  controlling a mixture of fuel and an oxidant based on the ambient pressure value; and
  transmitting the ambient pressure value to a communications bus.

19. A computer-readable medium according to claim 18, wherein said transmitting the ambient pressure value to the communications bus includes sending a packet indicating content of ambient pressure.

20. A method for upgrading a tire pressure monitoring system of a vehicle comprising:
  installing first instructions in a computer-readable medium accessible to an engine control system, said first instructions being arranged, upon execution thereof, to cause one or more processors to transmit an indication of ambient pressure to a communications bus; and
  installing second instructions in a computer-readable medium accessible to an engine control system, said second instructions being arranged, upon execution thereof, to cause one or more processors to perform the steps of:
  receiving the indication of the ambient pressure from a communications bus; and
  selectively activating a warning indicator visible to an operator of a vehicle based on a tire pressure of a tire, the ambient pressure, and a predetermined threshold.

* * * * *